June 11, 1957  G. HIRS  2,795,288
FILTER APPARATUS
Filed Jan. 16, 1956

INVENTOR.
GENE HIRS.
BY
Wallace P. Lamb,
ATTORNEY.

United States Patent Office 2,795,288
Patented June 11, 1957

2,795,288

FILTER APPARATUS

Gene Hirs, Detroit, Mich.

Application January 16, 1956, Serial No. 559,430

3 Claims. (Cl. 183—12)

This invention relates generally to an apparatus for cleaning air and particularly to an apparatus for collecting dust.

It is the general object of my invention to provide an improved apparatus for cleaning air more thoroughly than formerly proposed apparatus.

Another object of my invention is to provide an improved apparatus for cleaning air by stages which includes first removing the heavier of foreign particles from an air stream, then the less heavier particles, and finally the finest dust particles.

Another object of the invention is to provide an improved dust collector particularly suitable for industrial use which has a moisture impregnated fabric curtain through which the air passes and punctures moisture membranes that form across the interstices of the fabric whereby the punctured membranes form about and entrap the finest of dust particles and carry them out of the air stream for disposal.

Another object of the invention is to provide an improved dust collecting apparatus having an automatically replaceable air filter media arrangement.

Another object of the invention resides in the provision and arrangement of an air flow restriction, liquid baffle and liquid spillway to create a liquid-air turbulence to effect a scrubbing of the air.

Other objects of the invention will become apparent from the following detail description taken in connection with the accompanying drawing in which.

Figure 2:
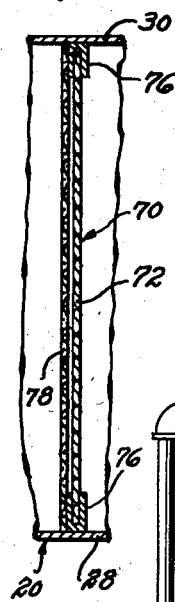
Fig. 2 is a horizontal sectional view, taken along line 2—2 of Fig. 1.
Figure 1:
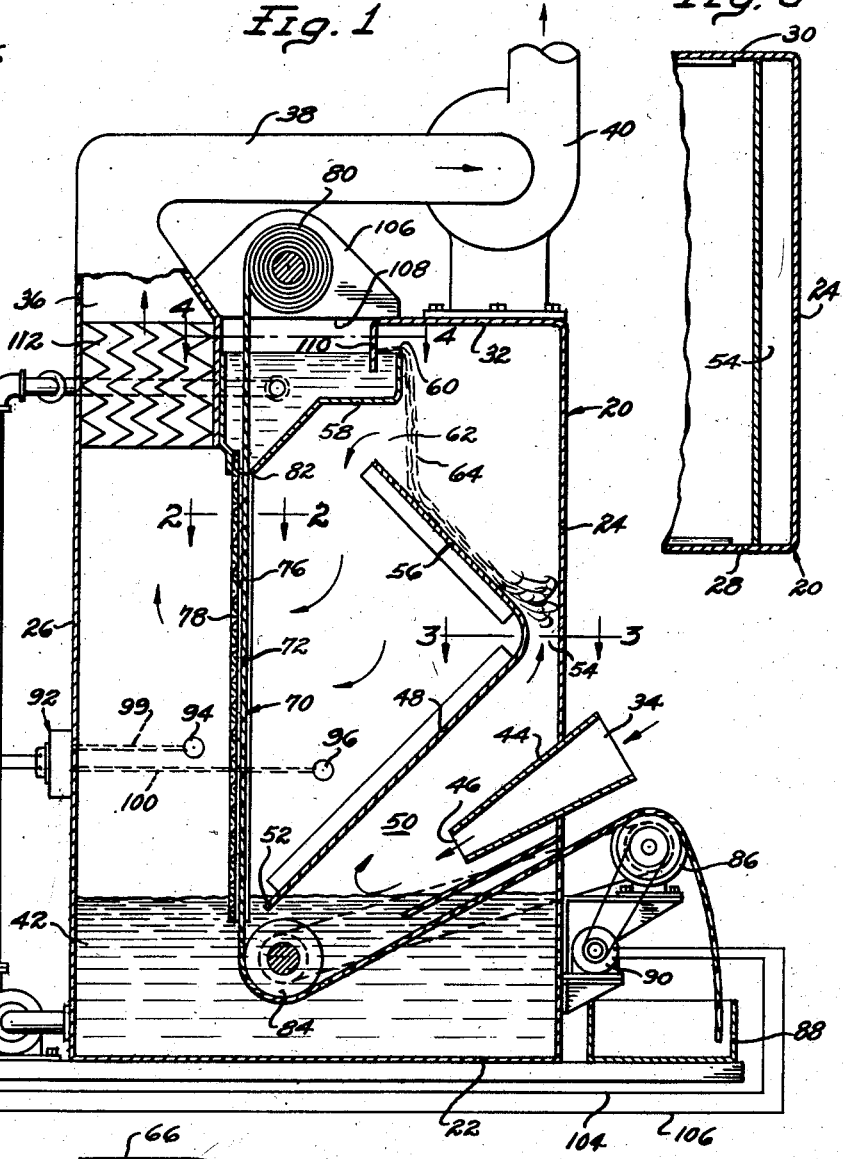
Fig. 1 is a vertical sectional view of my air cleaning or dust collecting apparatus, embodying features of the invention.
Figure 3:
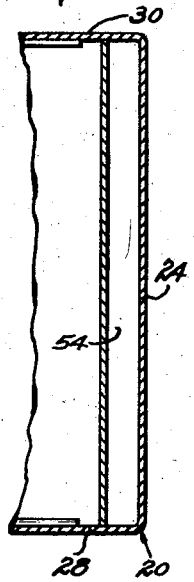
Fig. 3 is a horizontal sectional view, taken along line 3—3 of Fig. 1.
Figure 4:
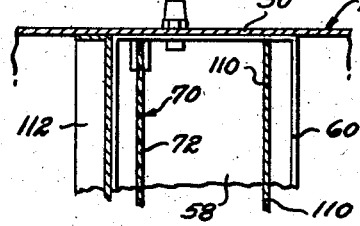
Fig. 4 is another horizontal sectional view, taken along line 4—4 of Fig. 1.

Referring to the drawing by characters of reference, my air cleaning, or dust collecting apparatus has a housing 20 which may be box-shape in construction having a bottom wall 22, upright walls 24, 26 and 28, 30, and a top wall 32. In upright wall 24 is an air intake 34 adjacent the bottom of the housing, and in the top wall 32 is an air outlet 36. The air intake 34 is open to the atmosphere of a room, factory, or other enclosed space wherein the air is to be cleaned. The outlet 36 is connected by a duct 38 to the intake of a suction fan 40 which draws air through the housing and discharges the air cleaned therein back into the room, factory or other enclosed space.

A lower portion of the housing 20 functions as a reservoir 42 and contains a body of liquid which functions to remove and collect the larger of foreign particles entrained in the air. This is the first stage of my apparatus for cleaning the air of all foreign matter and is accomplished by providing an air inlet member 44 arranged to direct air downwardly and at an angle against the surface of the liquid body to in effect knock the heavier foreign particles out of the air stream into the liquid where they are trapped by the liquid for disposal. The air inlet member 44 preferably extends substantially the width of the housing wall 24 and tapers from the intake to a smaller discharge 46 to increase air velocity prior to impingement of the air against the liquid surface. Any suitable liquid, such as water, oil, etc., may be used.

Overlying the air intake member 44 and a portion of the liquid surface is an air baffle member or plate 48 which cooperates with lower portions of housing walls 24, 28 and 30 to form an air intake chamber 50. The baffle 48 extends to the housing side walls 28, 30 and may be welded or be otherwise suitably secured thereto. As shown, a lower portion, as at 52, of the baffle 48 is submerged in the liquid to utilize the liquid as a seal against passage of air under the baffle. Extending upwardly from the liquid, the baffle 48 is inclined to housing wall 24 to form therewith an upper restricted passage 54 for increasing the velocity of the air discharging upwardly from the inlet chamber 50.

Above the air baffle 48 is a liquid baffle 56 which is arranged to direct liquid delivered from an upper reservoir 58 into the restriction 54, counter to the direction of air flow to effect liquid-air turbulence at the restriction 54. The creation of the liquid-air turbulence has a so-called scrubbing action on the air and is the second step or stage of my method of cleaning air. At this stage, the liquid air turbulence has the effect of removing intermediate size foreign particles from the air, or particles that are too small to be removed from the air by the first, or impingement step. The upper or liquid baffle 56 is inclined to wall 24 in the opposite direction from the inclination of the air baffle 48, or baffle 56 extends from the restriction 54 inwardly and upwardly from wall 24. Like the air baffle 48, the liquid baffle 56 extends to the opposite housing walls 28, 30 and may be welded, or be otherwise suitably secured thereto.

The upper reservoir 58 is spaced above the top of the liquid baffle 56 to provide an air passage 62 therebetween. In the present arrangement, the reservoir 58 is located near the housing top wall 32 and extends to the housing opposite side walls 28, 30 to which the reservoir may be welded, or be otherwise suitably secured. The reservoir 58 has an overflow or spillway 60 and liquid from the reservoir continuously overflows onto the baffle 56. This arrangement provides the dual function of (1) delivering liquid counter to the air stream to effect an air scrubbing action and (2) providing a thin curtain of liquid, as at 64, over air passage 62 for further cleaning of the air posterior to the turbulent action. Foreign particles removed from the air by the scrubbing action and by the spillway liquid screen 64 are washed down into the lower reservoir 42 for ultimate disposal.

Liquid is conducted from the lower reservoir 42 to the upper reservoir 58 by piping 66. A suitable pump 68 may be used to pump liquid up to reservoir 58, and at a rate to effect desired overflow at spillway 60.

In order to provide for removing very fine foreign particles from the air, or particles which may pass by the previously described air cleaning steps, I provide a vertically extending filter medium, designated generally by the numeral 70. The filter medium 70 comprises a porous curtain or fabric strip 72 and liquid saturating the strip and continuously supplied thereto from reservoir 58. The fabric curtain 72 extends at top and bottom thereof into the liquid reservoirs 58 and 42 respectively and is located between air passage 62 and outlet 36 so that air will be required to pass through the curtain. The curtain 72 extends into the upper reservoir 58 to receive liquid therefrom and to provide with the liquid, a seal against passage of air over the top of the curtain. Similarly, the curtain 72 extends into the liquid in the lower reservoir 42 to provide a seal against flow of air under the curtain.

The liquid flowing down through and over the fabric curtain 72 forms moisture membranes in the interstices of the fabric which membranes are punctured by air passing therethrough. When the air punctures the membranes, the moisture forming the membranes has the natural function of forming globules of moisture and in so doing envelop any foreign particle fine or otherwise that may have been in the air. These globules of moisture then descend by gravity carrying foreign particles out of the air stream down into the lower reservoir 42.

Secured to opposite walls 28, 30 of housing 20 is a pair of vertical guideways or channels 76 which receive marginal portions of the fabric curtain 72. These channels 76 retain the fabric curtain 72 and also effect a seal with liquid that flows down the channels to prevent passage of air between the side edges of the curtain and the adjacent sides of the housing. The channels 76 extend from the underside of upper reservoir 58 down and preferably into the liquid in lower reservoir 42, and the channels may be welded, or be otherwise suitably secured to the housing walls 28, 30.

A screen 78, which may be made of metal or any other suitable material, is provided to back-up the fabric curtain 72. As shown, the screen 78 may be secured at the top thereof to the reservoir 58 and at the sides thereof to legs of the channels 76.

The fabric curtain 72 extends from a roll 80 down through the liquid in reservoir 58 and through a drain slot 82 in the bottom of reservoir 58. Liquid continuously flows by gravity through the drain slot 82 to keep the fabric saturated. It is calculated that a clearance of about one sixteenth of an inch between the fabric and the drain slot 82 is satisfactory although the clearance may have to vary in accordance with the rate of drainage required for any given machine. The fabric 72 continues down from the drain slot 82 around a spool 84 that is submerged in the liquid of lower reservoir, and then continues upwardly out of the liquid, through housing wall 24 and around a discharge spool 86. Beneath the spool 86, a removable container 88 may be provided to receive the used fabric and foreign matter collected thereby.

Provision is made to unwind the fabric roll 80 and move the fabric curtain 72 down to present a clean section to the air stream since over a time period of operation, the fabric will become clogged with foreign matter removed from the air stream passing therethrough. When the fabric curtain 72 becomes clogged, the rate of air passing therethrough will, of course, decrease with accompanying decrease in efficiency, and increase in differential of pressures on opposite sides of the curtain. In order that replacement of the clogged curtain 72 may be accomplished entirely automatically, I provide an electric motor 90 to drive spools 86 and 84 under control of a switch 92 which responds to a predetermined increase in pressure differential on opposite sides of curtain 72. The motor 90 may, through any of the well known speed reduction devices, drive spools 86 and 84 through sprocket and chain drives, or belts, or other suitable means.

Any well known type of differential pressure responsive control may be used. In general, the control 92 comprises pressure responsive elements 94 and 96 which are located on opposite sides of the curtain 72 to respond individually to ambient pressures. The elements 94 and 96 are connected by tubes 99 and 100 respectively to a casing 102 containing a switch (not shown) which is connected to motor 90 by electric leads 104, 106. As is well known, the control contains a fluid through which the pressure responsive elements act to operate the switch.

The spool containing the roll of fabric 80 is freely and rotatably mounted on oppositely spaced brackets 106 of which only one is shown. Preferably, the brackets 106 are mounted on and secured to the housing top wall 32 in which an opening 108 is provided for passage of the fabric into the housing. To prevent escape of air from the housing through opening 108, a baffle 110 is arranged to extend down from the housing top wall 32 into the liquid in reservoir 58 to provide a trap rearwardly of the spillway 60. The baffle 110 extends entirely across the width of the housing and is spaced rearwardly of the parallel spillway, as shown.

In the housing, at the air outlet 36, a suitable moisture eliminator 112 is arranged to remove excessive moisture from the cleaned air before the air is discharged back into the room, or other enclosed space. The present moisture eliminator 112 is of the baffle type in which a plurality of offset baffle plates present a circuitous path for the air and excess moisture is deposited on the surfaces of the plates. Any other suitable moisture eliminator may be used with my air cleaning apparatus.

*Operation*

In operation, assuming that suction fan 40 is operating, air will be drawn into housing 20 through the air intake 44 which increases the air velocity and directs the air to impinge against the surface of the liquid in the reservoir 42. As the air impinges the surface of the liquid, the impact leaves large particles of foreign matter in the body of liquid or floating on the top thereof. The air continues upwardly under influence of the suction fan 40 and the velocity of the air is increased by the restriction 54. At the restriction 54, the air meets the counterflowing liquid from upper reservoir 58 and a turbulence is created which functions to scrub the air and extract therefrom, intermediate size foreign particles not removed by impingement of the air against the liquid in reservoir 42. The air continues upwardly from restriction 54 and then flows through the thin curtain of liquid 64 supplied from spillway 60 where the air is additionally cleaned, passing through passage 62 and then through the filter medium 70. In passing through the filter medium 70, the air punctures moisture membranes in the interstices of the fabric curtain 72 with the result that very fine dust particles and any others in the air stream are removed at this last stage in cleaning of the air. By supplying the proper amount of liquid from reservoir 58 to the fabric curtain 72, moisture membranes will form over the interstices of the fabric. These are punctured by the air and foreign particles are enveloped by the membrane moisture forming globules around the particles. This moisture and entrapped particles descend to the lower reservoir 42 for eventual disposal. During air cleaning operation, the pump 68 operates continuously to supply sufficient liquid to the upper reservoir 58 to maintain proper overflow from the spillway 60 and also proper flow from the drain slot 82. When the fabric curtain 72 becomes clogged and a resultant differential pressure develops on opposite sides thereof for which switch 92 is set, motor 90 will be energized to move the fabric curtain 72 down until the differential pressure is reduced to the normal operating value. Thus, the filter medium 70 is automatically replaced as required to maintain high efficiency of operation.

From the foregoing description, it will now be understood that I have provided an improved apparatus for cleaning air, or for dust collecting. By arranging for removal of foreign particles from an air stream by steps, or stages, starting with removal of the heavier particles and ending with removal of the finest particles, it will be appreciated that a more thorough and efficient air cleaning operation is provided. Also, it will be seen that I have provided for efficiently scrubbing air by creating liquid-air turbulence between counterflowing liquid and a velocity increase air stream. In this connection it will be noted that in my air cleaning apparatus, the liquid which creates air turbulence to remove dirt and other foreign matter from the air, is taken from the body of liquid used in the first cleaning step and is arranged to cascade down from a spillway to present a liquid curtain to further clean the air. In addition, I have provided an efficient and automatically replaceable filter medium made up of a fabric curtain and liquid supplied continuously thereto from the upper reservoir to remove fine and other particles of foreign matter at the last or final step of cleaning the air. At this step the fabric curtain functions to hold and present moisture membranes to the air streams so that when the air punctures said membranes, any foreign particles therein including the very finest dust particles will be entrapped by the punctured membranes and be carried down for disposal to the lower reservoir.

While I have shown and described my invention in considerable detail, it will be understood that the invention is to be limited only by the spirit and scope of the appended claims.

What I claim is:

1. An air cleaning apparatus comprising, a housing having an air inlet and an air outlet, means circulating air to be cleaned through said housing, a lower liquid reservoir within said housing, an air baffle extending upwardly from said reservoir forming an air inlet chamber with said housing, said baffle also forming an upper flow restricting outlet with said housing for increasing the velocity of air discharging through the restricting outlet from said inlet chamber, a liquid baffle within said housing above said air baffle and inclined to induce flow of a liquid into said restricting outlet to effect air turbulence to dislodge foreign particles from the air, an upper liquid reservoir, means operable to supply liquid to said upper reservoir, a spillway on said upper reservoir spaced directly above said liquid baffle for spilling a sheet of liquid onto said liquid baffle in the path of air flow, and a baffle extending from the top of the housing into said upper reservoir.

2. An air cleaning apparatus comprising, a housing having an air inlet and an air outlet, an air filter medium within said housing separating the inlet and outlet, means operable to induce air flow from the inlet through said filter medium and out of the outlet, an air baffle within said housing between said filter medium and the inlet forming an air inlet chamber with the housing, said chamber having an upwardly directed air flow restricting outlet discharging within said housing, a liquid baffle within said housing above said air baffle and arranged to direct flow of a liquid into the air restricting outlet to effect air turbulence, a liquid reservoir spaced above said liquid baffle and defining therewith an air flow passage establishing communication between said restricting outlet and said filter medium, means operable to deliver liquid to said reservoir, and a spillway on said reservoir for spilling the liquid over said passage onto said liquid baffle.

3. An air cleaning apparatus comprising, a housing having a lower air inlet and an upper air outlet, means operable to circulate air to be cleaned through said housing, a liquid reservoir within said housing below said inlet, said housing including upright and top walls, an upper liquid reservoir extending across said housing and partway down into said housing, a filter curtain extending downwardly through said upper reservoir into said lower reservoir, means operable to supply liquid to said upper reservoir, said upper reservoir and curtain cooperating to partition said housing into an air inlet chamber and an air outlet chamber respectively in communication with said inlet and outlet, an air baffle in the inlet chamber forming with said housing an upwardly discharging air flow restriction, an upper liquid baffle inclined downwardly to said restriction, said liquid baffle having an upper edge spaced directly below said upper reservoir, said baffles and upper reservoir forming a circuitous path for air flow including an upper passage formed by said upper reservoir and the upper edge of said liquid baffle, and a spillway on said upper reservoir overhanging and spaced above said liquid baffle for spilling a sheet of liquid onto said liquid baffle over said upper passage.

References Cited in the file of this patent

UNITED STATES PATENTS

| | | |
|---|---|---|
| 631,061 | Barbour | Aug. 15, 1899 |
| 782,190 | Clough | Feb. 7, 1905 |
| 794,166 | Erbsloh | July 11, 1905 |
| 1,103,995 | Murray | July 21, 1914 |
| 1,451,329 | Dressler | Apr. 10, 1923 |
| 1,982,639 | Christofferson | Dec. 4, 1934 |
| 2,042,289 | Baldwin | May 26, 1936 |
| 2,144,451 | Dollinger | Jan. 17, 1939 |
| 2,365,483 | Mode | Dec. 19, 1944 |
| 2,546,259 | Fenn | Mar. 27, 1951 |